Jan. 1, 1929.　　　　　W. F. HEROLD　　　　　1,696,912
SPRING RING
Filed July 6, 1926
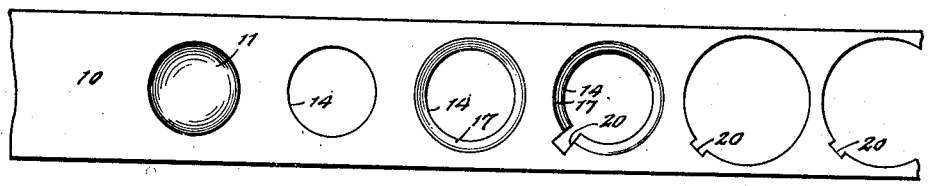
 
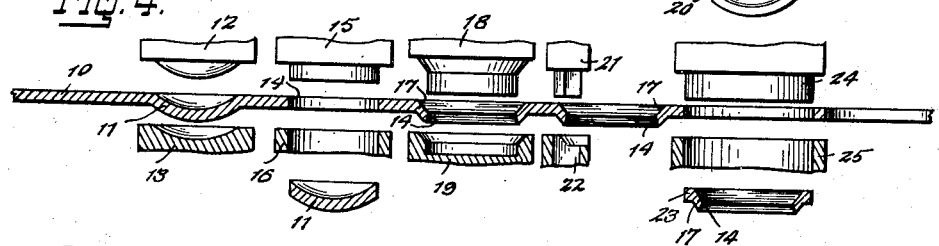
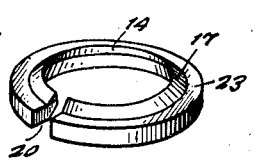 
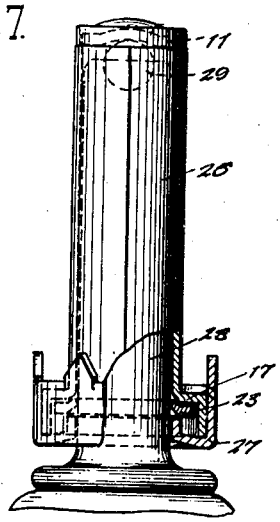  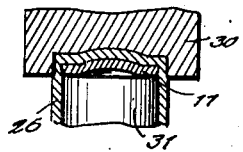
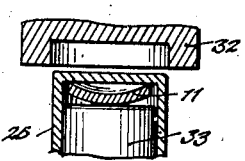
INVENTOR.
WALTER F. HEROLD.
BY
ATTORNEY Patented Jan. 1, 1929.

1,696,912

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

SPRING RING.

Application filed July 6, 1926. Serial No. 120,672.

The present invention relates to an improved sheet metal spring ring.

Spring rings have heretofore been produced by bending wire, or other stock, into ring shape, which was unsatisfactory not only from the standpoint of production and expense, but from the fact that it was practically impossible to maintain exact sizes and tensions, and in the production of small diameters the rings would not conform to a true circle, due to their tendency to straighten out at the ends. This was particularly true in the production of rings having a noncircular cross-section, the bending operation in this case also tending to change the cross-sectional shape, so that it was not uniform at all points.

It is proposed in the present invention to provide a spring ring from flat sheet metal stock, to the end that it may be economically produced by means of shaping and blanking dies, and in which exact shapes and sizes may be accurately maintained and the desired tension positively determined, and maintained in production.

A further object is to produce, as a part of the process of making the spring ring, a concavo-convex, or other suitably shaped, disc or plate, the spring and plate thus produced, adapted, for example, for use in a caster socket construction as disclosed in my copending application Serial Number 120,671, filed July 6, 1926, although the spring, as well as the plate, are adapted for numerous other uses.

Another object is to produce a ring of noncircular and uniform cross-section, and particularly one having a beveled lead surface for guiding the insertion of a pintle, or the like. It is also proposed to provide a ring of relatively thin metal thickness, so that it will occupy a relatively narrow space, and which ring will at the same time be relatively strong.

With the above and other objects in view, an embodiment of the invention is shown in the accompanying drawings, and this embodiment will be hereinafter more fully described with reference thereto, and the invention will be finally pointed out in the claims.

In the drawings,

Fig. 1 is a plan view of a sheet metal blank strip, showing the several steps of producing the concavo-convex plate and split spring ring, according to the present embodiment of the invention;

Fig. 2 is a plan view of the plate;

Fig. 3 is a plan view of the spring ring;

Fig. 4 is a longitudinal sectional view through the blank, and the plate and spring ring produced therefrom, and showing the relation of the forming and blanking dies thereto;

Fig. 5 is a perspective view of the split spring ring;

Fig. 6 is a perspective view of the concavo-convex plate;

Fig. 7 is a side elevation, partly in section, of a caster socket provided with a spring ring and plate produced according to the invention;

Fig. 8 is a sectional view, showing the plate inserted in the socket, and the securing dies in position to secure the plate;

Fig. 9 is a similar view showing the plate secured;

Figs. 10 and 11 are views similar to Figs. 8 and 9 of another form of socket top bearing.

Similar reference characters indicate corresponding parts throughout the several figures of the drawings.

Referring to the drawings, the split spring ring and concavo-convex plate, according to the present embodiment of the invention, are adapted to be produced from a flat sheet metal blank strip 10, of brass, spring steel, phosphor bronze, or other suitable metal, by being fed in step by step relation through an automatic forming and blanking press, where the several operations of forming and blanking the metal are performed. The steps of the process may, however, be performed by any desired mechanical means.

The blank is first bumped up, as at 11, by forming dies 12 and 13, to provide a concavo-convex circular shape, the bumped up portion being next blanked out, as at 14, by blanking dies 15 and 16, the plate thus produced dropping into a suitable receptacle. The edge of the hole 14 is next flanged by swaging, as at 17, by forming dies 18 and 19, the flange being beveled and extending from a point inwardly spaced from the outer periphery of the finished ring. The step of swaging the flange 17 so compresses the metal that it is rendered relatively thinner, as clearly shown in Figs. 4 and 5, and is hardened, and in the case of relatively soft annealed brass has the effect of the extra rolling operations to which annealed brass is usually subjected to render it hard and springy. The next step consists in producing a cut 20 at one point in the ring blank the cut extending from the hole 14 to a point in the strip outside the outer periphery of the ring forming portion, suitable piercing dies 21 and 22 being employed for this purpose. The cut may be radial, as shown, or it may be diagonally or otherwise disposed. The completed split spring ring 23 is finally blanked out by blanking dies 24 and 25, and drops into a suitable receptacle.

The ring thus produced is a true circle, and will lie within a true flat plane, and these characteristics will obtain with even the smallest diameters. The beveled flange rendered springy by the swaging and hardening action of the forming dies, imparts tension to the ring, the degree of tension being determined by the extent of the flange, that is, increase in the depth of the flange proportionately increases the tension.

In Fig. 7 I have illustrated, as an example, an application of the split spring ring and concavo-convex plate in a caster socket 26, this particular type of socket being disclosed and claimed in my co-pending application, above referred to. The ring is loosely disposed in an annular pocket 27 provided in the base of the socket, and is adapted to grip the pintle 28 to retain it. The beveled flange, it will be noted, provides a positive seating surface at the upper side and a lead surface at the under side for guiding the insertion of the pintle. The relatively thin metal thickness enables the spring to be disposed in a comparatively narrow space. The concavo-convex plate is adapted to be used as a reinforcing top pintle bearing for the ball end 29 of the pintle, being first loosely engaged in the socket in contact with the domed upper end thereof, as shown in Fig. 8, and then compressed and expanded at its marginal portion by means of suitable dies 30 and 31 to secure it in the socket end, its diameter in the secured relation being greater than that of the ring opening. In Figs. 10 and 11 the plate is inserted in relation to a flat-topped socket with its concave side upwardly, being then flattened and expanded by means of dies 32 and 33. This bearing will withstand very heavy loads, and enables the use of a socket formed of relatively thin gauge metal.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. As an article of manufacture, a flat sheet metal split ring including a swaged annular tension imparting portion of relatively increased hardness rendering the ring springy in a plane parallel to the flat plane of the ring.

2. As an article of manufacture, a flat sheet metal split ring including a flat annular portion and an annular tension imparting flange portion relatively thinner and harder than said flat annular portion rendering the ring springy in a plane parallel to the plane of the ring.

3. As an article of manufacture, a flat sheet metal split ring, and including an annular tension imparting flanged portion rendering the ring springy in a plane parallel to the flat plane of the ring.

4. As an article of manufacture, a flat sheet metal split ring, including an annular portion disposed in a flat plane and an annular tension imparting portion bent out of said plane and rendering the ring springy in a plane parallel to the flat plane of the ring.

5. As an article of manufacture, a flat sheet metal split ring, including a cylindrical periphery and flat upper and lower surfaces adjacent said periphery and an annular tension imparting flange portion extending from the other periphery to said flat surfaces and rendering the ring springy in a plane parallel to the flat plane of the ring.

6. As an article of manufacture, a flat sheet metal split ring, including an outer cylindrical periphery and flat upper and lower surfaces adjacent said periphery and an annular tension imparting flange portion extending from the inner periphery to said flat surfaces and rendering the ring springy in a plane parallel to the flat plane of the ring.

7. As an article of manufacture, a split spring ring formed of flat sheet metal of relatively low resiliency including an annular flange portion bent out of the plane of said sheet metal and imparting increased resiliency to the ring.

Signed at Newark, in the county of Essex, and State of New Jersey, this 25th day of June, 1926.

WALTER F. HEROLD.